United States Patent [19]
Miller

[11] Patent Number: 4,927,781
[45] Date of Patent: May 22, 1990

[54] METHOD OF MAKING A SILICON INTEGRATED CIRCUIT WAVEGUIDE

[76] Inventor: Robert O. Miller, 5523 Vaden St., Box 99701, The Colony, Tex. 75056

[21] Appl. No.: 326,104

[22] Filed: Mar. 20, 1989

[51] Int. Cl.⁵ .................... H01L 21/76; H01L 21/203
[52] U.S. Cl. .............................. 437/71; 148/DIG. 95; 148/DIG. 118; 156/649; 156/662; 357/17; 357/49; 372/102; 437/62; 437/129; 437/228; 437/239
[58] Field of Search ................ 148/DIG. 81, 95, 114, 148/117, 118; 156/648, 649, 662; 357/17, 19, 55, 56, 49; 372/102, 43, 50; 437/61, 67, 71, 81, 62, 129, 238, 239

[56] References Cited

U.S. PATENT DOCUMENTS

| | | | |
|---|---|---|---|
| 4,104,090 | 8/1978 | Pogge | 437/71 |
| 4,426,440 | 1/1984 | Thompson | 430/321 |
| 4,464,762 | 8/1984 | Furuya | 372/50 |
| 4,628,591 | 12/1986 | Zorinsky et al. | 437/71 |
| 4,737,946 | 4/1988 | Yamashita et al. | 350/96.11 |
| 4,750,799 | 6/1988 | Kawachi et al. | 350/96.11 |
| 4,810,667 | 3/1989 | Zorinsky et al. | 437/62 |

FOREIGN PATENT DOCUMENTS

| | | | |
|---|---|---|---|
| 0020678 | 2/1979 | Japan | 437/71 |
| 0149749 | 9/1982 | Japan | 437/71 |
| 0077240 | 5/1983 | Japan | 437/71 |
| 0192344 | 11/1983 | Japan | 437/71 |
| 0124511 | 6/1987 | Japan | |

Primary Examiner—Brian E. Hearn
Assistant Examiner—William Bunch
Attorney, Agent, or Firm—Ross, Howison, Clapp & Korn

[57] ABSTRACT

A method for forming a semiconductor waveguide includes forming a layer of expitaxial silicon over a substrate. The impurity concentration of the layer is higher than that of the substrate. A second layer of epitaxial silicon is disposed over the upper surface of the layer with a higher resistivity than that of the substrate. A masking layer is then disposed over the substrate and then patterned, and then the layer selectively etched down to the upper surface of the layer. The layer is then porified to form an insulating layer from the layer. The porous film is then converted by oxidation to a silicon dioxide layer. The sidewalls of the resulting ridge are then oxidized to form sidewall layers and then the masking layer removed from the upper layer. The upper surface of ridge is oxidized to form an upper insulating layer to extend the sidewall layer over the entire upper surface and sidewalls of the ridge. A layer of insulating material is then disposed over the substrate.

11 Claims, 2 Drawing Sheets

METHOD OF MAKING A SILICON INTEGRATED CIRCUIT WAVEGUIDE

TECHNICAL FIELD OF THE INVENTION

The present invention pertains in general to integrated optics, and more particularly, to a waveguide fabricated utilizing integrated optic technology.

BACKGROUND OF THE INVENTION

As integrated optics has developed, the use of various components peripherally related with such things as integrated lasers, switches, etc. has also developed. One of the most important peripheral elements is waveguide interconnects. Although optical fibers are utilized for long transmission lengths to interconnect various locations due to their minimum transmissive power loss, these would be classified as discrete elements and are impractical for an integrated circuit relating to optics.

While it has long been useful to fabricate integrated optic waveguides from other materials disposed on silicon, using its superior mechanical properties, it has become practical to fabricate the waveguides from silicon itself. In recent years, the efforts of the telecommunications industry to minimize dispersive power loss in fibers have driven carrier wavelengths further into the infrared spectrum. Presently, the commonly used wavelengths are 1.3 um and 1.55 um. Consequently, the need has arisen for integrated optical devices to operate at long wavelengths as well. Silicon itself is transparent in the 1.2–6.0 micrometer wavelength range and therefore provides some advantages as integrated waveguides in that it behaves as a low loss dielectric in its single crystalline, semi-insulating state, i.e., low-doped. Integrated waveguides are typically fabricated from dielectric slabs or channels that are clad or bounded by dielectrics with lower indices of refraction. This allows the light to propagate within the waveguide with very little attenuation due to the confinement of the light waves by total internal reflection. Silicon with its index of refraction of approximately 3.5 at a wavelength of 1.3 micrometer will form a waveguide when clad by silicon dioxide, which has an index of refraction of approximately 1.5.

One of the primary problems with disposing silicon dioxide about a silicon waveguide is the accessibility to the silicon surfaces during processing. In one process wherein the surfaces are accessible from top side processing, ridge structures are etched with or without subsequent back fill. This results in roughness due to etching process which leads to scattering losses when light reflects from the ridge walls. Further, this process utilizes air on the exterior with an index of refraction of 1.0 as compared to the index of refraction for silicon of 3.5, resulting in a large refractive index difference, and further enhancing scattering loss.

In another top side process, the ridge structures are etched and then a layer of thermal oxide formed on the etched surfaces. This provides some improvement in that the silicon dioxide has a higher refractive index as compared to air and the surface roughness is smoothed out by the oxidation reaction. Further, this silicon dioxide/silicon interface formed by the thermal oxidation tends to have silicon-rich transition layers near the boundary, resulting in a graded index profile.

Other processes for fabricating semiconductor waveguides are directed toward surfaces which are not accessible to top side processing, i.e., the undersides of the channels. In one process, a heavily doped substrate is utilized with the ridge waveguide formed on the upper surface thereof. This is illustrated in R. A. Soref et al., "Silicon Guided-Wave Optics", Solid State Technology, November, 1988, page 95. One problem with this type of structure is that the refractive index difference is very small such that a large fraction of transmitted power is actually carried in the heavily doped region if the waveguide above it is sufficiently thin. Heavily doped silicon, however, is a very absorptive material resulting in significant light attenuation.

Another structure for processing the underside of the waveguide utilizes the underlying layer of silicon dioxide with silicon deposited on the upper surface thereof. With this type of process, it is necessary to fabricate defect free monocrystalline silicon layers. Any degree of defectiveness or polycrystallinity will drastically increase absorption. This is typically referred to as silicon on insulator (SOI) technology.

Another type of SOI technology requires the formation of buried silicon dioxide by high energy implantation of oxygen ions through single crystal silicon, followed by high temperature annealing. This is referred to as the SIMOX process in Kurdi and Hall, "Optical Waveguides in Oxygen-Implanted Buried-Oxide Silicon-On-Insulator Structure", Optics Letters, February, 1988, volume 13, number 2, page 175. The problems with this type of system are the complexity and the size of the high energy implanters, residual damage in the silicon, and stress and deformation brought about by several factors, including volumetric expansion from the implanted oxygen, volumetric expansion from the subsequent silicon-to-silicon dioxide transition, and the extremely high temperature required for the transition.

SUMMARY OF THE INVENTION

The present invention disclosed and claimed herein comprises a method for fabricating a semiconductor waveguide. The waveguide is fabricated by first providing a semiconductor substrate having a low doping level. A first layer of semiconductor material is formed over the surface of the substrate and doped to a higher concentration than the substrate. A second layer of semiconductor material is then disposed over the surface of the first layer with a lower concentration of dopant materials and the masking layer is disposed on the upper surface of at least one ridge. The second layer of semiconductor material is then patterned and selectively etched down to the upper surface of the first layer of semiconductor material to define at least one ridge. The first layer of semiconductor material is then porified and oxidized to form an insulating layer underneath at least one ridge. Insulating sidewall layers are formed on the substantially vertical surface of the at least one ridge and the masking layer removed. An insulating layer is then formed over the upper surface of the at least one ridge.

BRIEF DESCRIPTION OF THE DRAWINGS

For a more complete understanding of the present invention and the advantages thereof, reference is now made to the following description taken in conjunction with the accompanying Drawings in which.

DETAILED DESCRIPTION OF THE INVENTION

Figure 1:
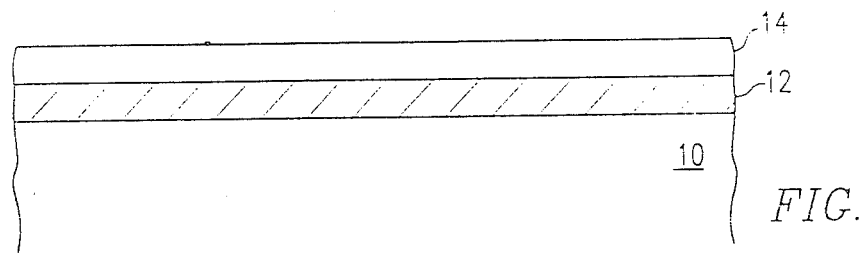
FIG. 1 illustrates a cross-sectional diagram of a substrate with two epitaxial layers, an anodizable and a low-doped top layer.

Referring now to FIG. 1, there is illustrated a cross-sectional diagram of a semiconductor substrate 10. The semiconductor substrate 10 is comprised of an intrinsically doped silicon doped to conventional levels. The surface of the substrate is covered with an expitaxial layer 12 and an epitaxial layer 14. The expitaxial layer 12 is typically formed after cleaning the starting substrate and which can be an N-type substrate in the 2-4 Ohm-cm range and then immediately thereafter growing an N-plus epitaxial (epi) layer doped in the range of $10^{18}$cm$^{-3}$ to $10^{19}$cm$^{-3}$ to a predetermined thickness. This results in the layer 12 which serves as an anodizable layer with a resistivity and thickness utilized to set the final porosity of the anodized film and the final thickness of an isolation oxide, respectively. The second layer 14 is an N-type epilayer that is grown with a higher resistivity in the 10-100 Om-cm region to provide the structure in FIG. 1.

Figure 2:
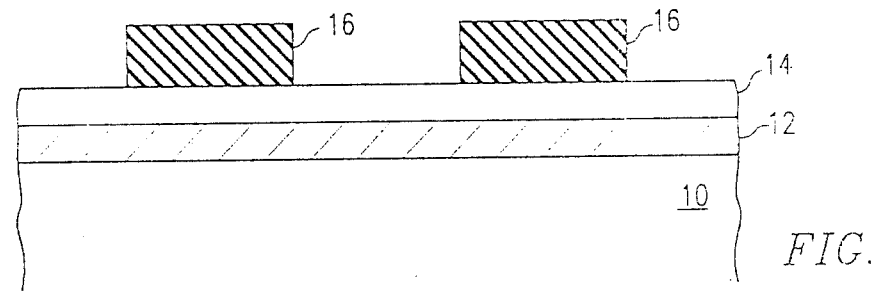
FIG. 2 illustrates the structure of FIG. 1 with a masking pattern.
Figure 3:
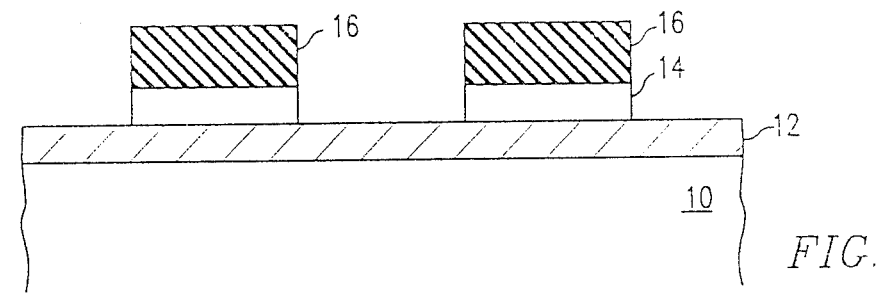
FIG. 3 illustrates the structure of FIG. 2 after etching of the top layer to form ridged channels.

Referring now to FIG. 2, after forming the epilayers 12 and 14, a layer of masking material is disposed over the substrate and then patterned using photolithographic techniques well known in the art, to form masking regions 16. The masking structure is composed to act as a selective etch mask, an anodization mask, and an oxidation mask. A bilayer of chemical vapor deposited silicon oxide on top of LPCVD silicon nitride can be used for this purpose. Each of the masking regions 16 defines a waveguide structure. This structure is then etched as illustrated in FIG. 3 to etch only the upper epilayer 14 and leave the lower epilayer 12 untouched. This is a selective etch process whereby the resulting walls are vertical or nearly vertical. The resulting ridge channels are defined by the masking layer 16, and the ridge cross section is essentially rectangular, where the width can be chosen to be any value from that of the thickness of layer 14 to much larger. It is shown in the figure that a portion of the masking layer 16 thickness is consumed in the RIE process. In another embodiment, the vertical etching is carried out partially through or completely through the layer 12.

Figure 4:
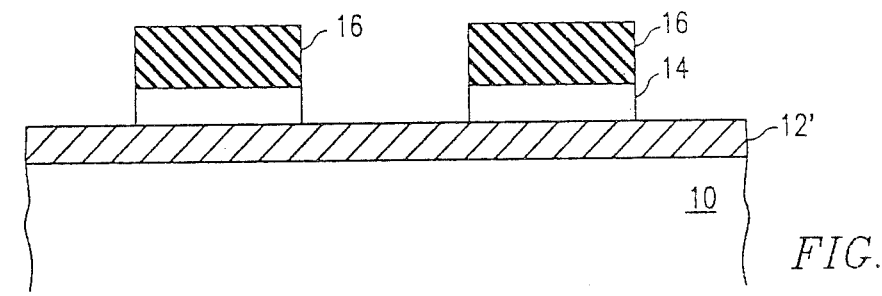
FIG. 4 illustrates the structure of FIG. 3 after the structure has been anodized.

As illustrated in FIG. 4, after definition of the ridge channel 14', the layer 12 is then anodized to form a layer 12'. The desired porosity of 50%-60% is achieved by subjecting the substrate to HF acid in a concentration that varies between 10% by weight up to 40% by weight with current densities ranging from 30-200 mA/cm$^2$. This type of porosity is achieved since the epilayer 12 initially had a doping level on the range of $10^{18}$cm$^{-3}$ to $10^{19}$cm$^{-3}$. The anodizing layer is described in E. J. Zorinsky, D. D. Spratt, R. L. Virkus, "The 'Islands' Method —A Manufacturable Porous Silicon SOI Technology", Technical Digest, International Electron Devices Meeting, Los Angeles, Dec. 7-10, 1986, which is hereby incorporated by reference.

Figure 5:
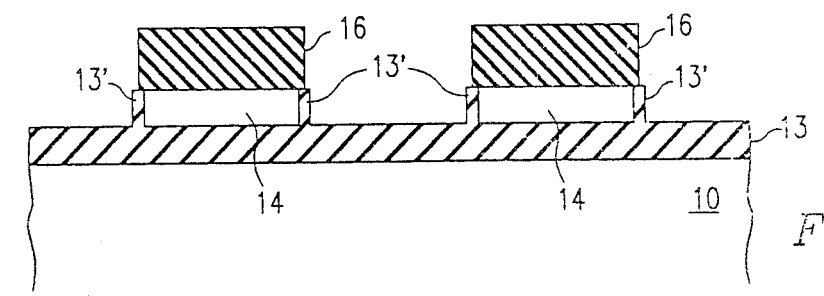
FIG. 5 illustrates the structure of FIG. 4 after converting of the porous film by oxidation and forming of side wall oxide layers.
Figure 5A:
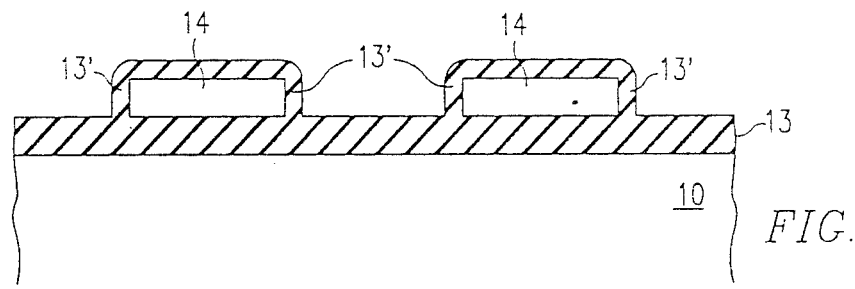
FIG. 5a illustrates the structure of FIG. 5 after removing the masking material and formation of a top oxide layer.

Referring now to FIG. 5, after converting the anodizable layer 12 to a porous film 12', the porous film is converted by oxidation to $SIO_2$ as layer 13. This results in an $SiO_2$ underlayer 13 formed without a change in volume from that of the original layer 12, which is advantageous in preventing stress and deformation of the ridge. The oxidation is performed by subjecting the surface to a high temperature and pressurized oxidizing ambient. In this process, a small amount of oxidation has simultaneously occurred on the sidewalls of the ridges to form sidewall oxide layers 13'. Simultaneous oxidation of the top side has been prevented by the masking film 16. After the removal of 16, another oxidation is performed to extend the $SiO_2$ sidewall over the tops of the ridges 14. Oxidation of tops and sidewalls in separate steps helps maintain the desired rectangular shape of the silicon core, while providing a thermal oxide cladding completely around the silicon cores.

After formation of the sidewall oxide layers 13', a dielectric back fill layer 18 is deposited on the substrate in between the ridge channels 14. This results in a thicker cladding on the upper surfaces and side surfaces without further consumption of the core.

Figure 6:
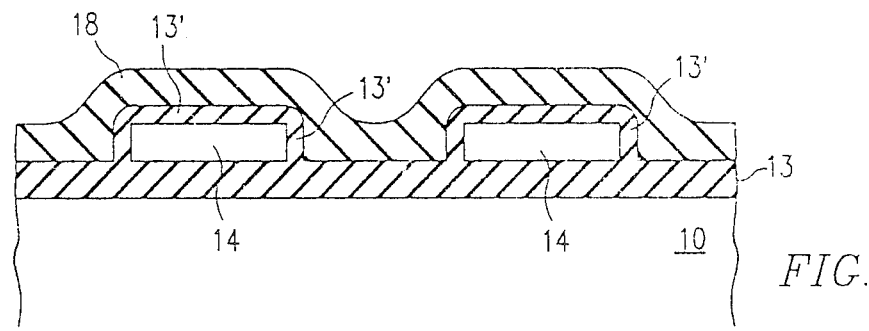
FIG. 6 illustrates the structure of FIG. 5 after a dielectric back fill.
Figure 7:
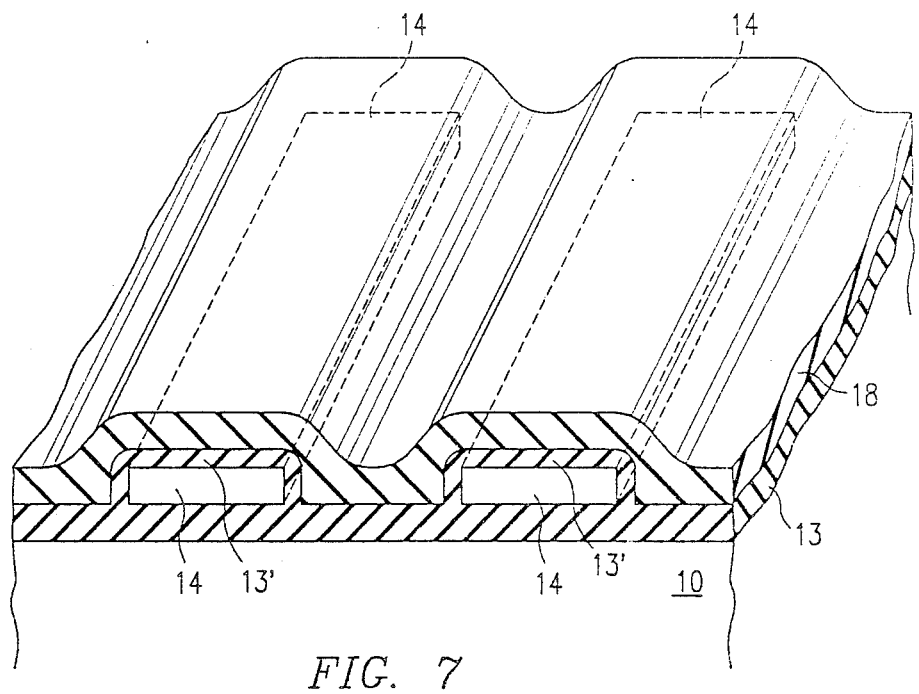
FIG. 7 illustrates a perspective view of the structure of FIG. 6.

Referring now to FIG. 7, there is illustrated a perspective view of the structure of FIG. 6. It can be seen in FIG. 7 that the ridge channels 14 are longitudinal in shape and form waveguides, with silicon cores 14, which are the propagating media, silicon oxide cladding 13 and 13', and silicon dioxide as an additional dielectric layer 18. To prevent radiative noise or stray signals from refracting into the waveguides, it is necessary to cover the structure shown with an opaque material. Access to a waveguide, for purposes of input or extraction of radiation, is accomplished by either juxtaposing a coupling structure to an exposed core end or selectively exposing the core on the top or sides, as by etching through the dielectric layers. Access to the waveguides can be made by either selective removal of oxide or coupling to exposed silicon ends.

For a given wavelength of light to be transmitted in a waveguide, the cross-sectional dimensions of the core 14 and the thickness of the cladding 13 depend on the propagation modes chosen and the degree of confinement required. For example, at the standard telecommunications wavelength of 1.3 um, the refractive indices of silicon, 3.5, and silicon dioxide, 1.5, impose a TE monomode cutoff of approximately 0.21 um. In other words, in applications that require single mode propagation, the vertical dimension of the core 14 cannot exceed 0.21 um. In applications where multimode propagation is allowed or required, the vertical dimension of the core can be or will be greater than 0.21 um.

At a thickness of 0.21 um, the confinement factor, i.e., the fraction of the electric field of the light wave contained in the core, is approximately 0.85. The remaining 15% of the electric field exists outside the core in an exponentially decaying, lossless, evanescent mode. It is important that very little of the electric field extend to the substrate 10, whereupon it contributes to leakage loss of power. The thickness of cladding layer 13 required to reduce the electric field intensity at the layer 13 and substrate 10 boundary to 1% of maximum is approximately 0.34 um. As the vertical dimension of the core is reduced below 0.21 um, the confinement factor is also reduced, and the thickness of layer 13 must increase to satisfy the same leakage criteria. In the case of longer-wavelength single-mode light propagation, the maximum vertical dimension of the core 14 is greater, but the evanescent mode intensity falls of more gradually in the cladding, so a thicker layer 13 is required. For example, at the wavelength 3.0 um, the maximum thickness of the core 14 is approximately 0.47 um, and the thickness of the cladding 13 required to meet the leakage criterion chosen above is 0.76 um.

Although the preferred embodiment has been described in detail, it should be understood that various changes, substitutions and alterations can be made therein without departing from the spirit and scope of the invention as defined by the appended claims.

I claim:

1. A method for fabricating a semiconductor waveguide, comprising:
   providing a semiconductor substrate having a low or intrinsic level of dopant impurities;
   forming a first layer of semiconductor material over one surface of the semiconductor substrate to a predetermined thickness;
   forming a second layer of semiconductor material over the surface of the first layer of semiconductor material;
   masking the upper surface of the second layer of semiconductor material with a masking layer;
   patterning the second layer and masking to define at least one ridge;
   selectively etching the second layer of semiconductor material and the masking layer in accordance with the pattern to etch the second layer down from the upper surface thereof and substantially to the upper surface of the first layer of semiconductor material to form at least one ridge having an upper surface and two substantially vertical surfaces and a lower surface adjacent the upper surface of the first layer of semiconductor material;
   converting the first layer of semiconductor material to an insulating material adjacent the lower surface of the at least one ridge;
   forming a layer of insulating material on the substantially vertical surfaces of the at least one ridge;
   removing the masking layer from the upper surface of the at least one ridge; and
   forming an insulating layer on the upper surface of the at least one ridge.

2. The method of claim 1 wherein the first layer of semiconductor material has a higher concentration of dopant impurities than the semiconductor substrate and the second layer of semiconductor material has a lower concentration of dopant impurities than the semiconductor substrate.

3. The method of claim 1 wherein the step of converting the first layer of semiconductor insulating material comprises:
   porifying the first layer of semiconductor material; and
   converting the porified semiconductor material in the first layer to a layer of silicon dioxide.

4. The method of claim 3 wherein said first layer of semiconductor material comprises an expitaxial layer having a higher conductivity than the semiconductor substrate.

5. The method of claim 4 wherein the second layer of semiconductor material is comprised of an expitaxial layer of semiconductor material having a concentration lower than that of the semiconductor substrate to provide a high resistivity layer and highly light-transmissive.

6. The method of claim 3 wherein the semiconductor substrate and the semiconductor material of the first and second layer is comprised of silicon based compounds.

7. The method of claim 3 wherein the first layer of semiconductor material is comprised of an expitaxial layer of silicon and the step of porifying the first layer results in the formation of silicon dioxide from the first layer.

8. The method of claim 3 wherein the step of patterning the upper surface of the second layer of semiconductor material comprises:
   forming a layer of masking material over the upper surface of the second layer of semiconductor material;
   patterning the masking layer to find the upper surface of the at least one ridge; and
   wherein the masking layer is utilized to protect the upper surface of the at least one ridge during formation of the insulating sidewall layers.

9. The method of claim 3 wherein the step of forming the insulating sidewall layers comprises forming the insulating sidewall layers by thermal oxidation of the substantially vertical surfaces of the at least one ridge.

10. The method of claim 3 wherein the step of forming the insulating layer on the upper surface comprises:
    oxidizing the upper surface of the at least one ridge to form a thin layer of thermal oxidation; and
    forming a conformal layer of silicon dioxide over the surface of the substrate.

11. The method of claim 1 wherein the step of selectively etching the second layer of semiconductor material comprises etching through the masking layer and the second layer of semiconductor material and partially into the upper surface of the first layer of semiconductor material.

* * * * *